United States Patent Office 3,770,753
Patented Nov. 6, 1973

3,770,753
β-PYRIDYL CARBINOL NICOTINOYL GLYCINATE
Albert H. Beaufour, Paris, France, assignor to Societe d'Etudes de Produits Chimiques, Moulineaux, France
No Drawing. Filed Jan. 4, 1972, Ser. No. 215,428
Int. Cl. C07d 31/36
U.S. Cl. 260—295.5 A                    1 Claim

ABSTRACT OF THE DISCLOSURE

The present invention provides the new compound (beta-pyridyl carbinol) nicotinoyl glycinate, which has the formula:

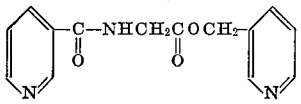

This compound is to be used in drugs for the treatment of cerebral arteriosclerosis and of any form of arteriopathies.

---

The present invention provides the new compound (beta-pyridyl carbinol) nicotinoyl glycinate, which has the formula:

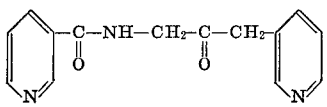

The molecular weight of the above compound is 271.2 and the empirical formula is $C_{14}H_{13}O_3N_3$. The compounds shows an interesting therapeutic action in the vascular field. The therapeutic action of this compound is more specially remarkable for it associates a good peripheral vasodilator action to hypolipemic and hypocholesterolemic actions.

The invention also provides a process for the preparation of (beta-pyridyl carbinol) nicotinoyl glycinate, which comprises reacting nicotinuric acid with nicotinic alcohol in the presence of sulfuric acid. It is necessary to use an excess either of nicotinuric acid or of nicotinic alcohol. Nicotinuric acid may be obtained by reacting nicotinoyl chloride on ethyl-glycinate and hydrolyizing the ethyl nicotinurate obtained to the corresponding acid.

The invention is illustrated by the following examples.

EXAMPLE 1

Into a 10-litre reactor fitted with stirring means there are poured 2.5 l. of sulfuric acid wherein are added under stirring 2.5 kg. of nicotinuric acid (excess of about 30% with respect to the nicotinic alcohol). The temperature raises up to 80–90° C. the ncomes back to 65–75° C. There is thus added as fast as possible under stirring and while cooling 1 kg. (0.92 l.) of nicotinic alcohol. Stirring is maintained for 15 mn. and temperature is 60–70° C. This solution is poured into a reactor containing 34 l. of water and 7.8 kg. of sodium hydrocarbonate. pH is checked and, if necessary, adjusted to 7–7.5 and this solution is extracted at 25–30° C., twice with methylene chloride (first time by 5 l., second time by 2.5 l.). The extracting solution is washed with saturated solution of sodium hydrochloride then dried by sodium sulfate and decolorized by carbon black. After filtration and washing by methylene chloride the solution is concentrated under vacuum at 50–60° C. There is obtained 1.2 kg. of dried extract which is dissolved in ethyl acetate at the boil. This solution is allowed to cool gently at 0/+5° C. under mild stirring at this temperature for at least three hours.

Beta-pyridyl carbinol nicotinoyl glycinate precipitates and is separated by filtration and washed. Yield is 1 kg. of product i.e. 40% in weight with respect to the starting material. Analysis shows a perfect conformity with the formula.

The nicotinuric acid is obtained by reacting in a perfectly dried 40 l. reactor a suspension of 16 l. of dried dichlorethane, 2.2 kg. of ethyl glycinate (hydrochloride) and 2.8 kg. of nicotinoyl chloride (hydrochloride). The suspension is warmed under stirring at 60/60° C. and the hydrochloric acid is given off. When all the hydrochloric acid is given off, the reacting mixture is cooled at 20/25° C. and extracted with 15 l. of water. The extracted solutions are treated by a potash wash at a temperature not exceeding 25° C. to reach a pH value of 12–12.5. The solution is decolorized by carbon black, filtered and the decolorized aqueous solution is treated under stirring by hydrochloric acid until pH value of 3/+0.2 is obtained. There is thus obtained a suspension of nicotinuric acid which is stirred for at least 2 hours at 15/20° C.

This precipitate is separated and carefully dried in order to eliminate water as completely as possible. Yield is 2.5 kg. of acid which means 88% with respect to ethyl glycinate (in weight).

EXAMPLE 2

Using the same reactor as in Example 1, there are poured therein 1.8 kg. of nicotinuric acid, 2.2 kg. of nicotinic alcohol (excess of 100% with respect to nicotinuric acid) and under stirring 1 kg. of sulfuric acid. The suspension obtained is then heated at 130° C. for 8 hours under stirring after which the suspension has turned to a solution. The excess of nicotinic alcohol is evacuated by distillation and there are added slowly 3 l. of water. The pH of the mixture is adjusted to 7 by addition of an ammonia solution. At this pH appears a precipitate corresponding to a small amount of non-reacted nicotinuric acid which is separated and can be used in a further synthesis. The solution obtained is treated by a saturated solution of sodium hydrochloride and then extracted by chloroform, decolorized and recrystallized as in Example 1. The yield is 25% with respect to the reacted nicotinuric acid.

This compound has a low toxicity: $LD_{50}$ on mice is 3.2 g./kg. I.P. and over 5 g./kg. per os. Subacute toxicity determined on rats does not reveal any death or trouble at doses corresponding from 0.1 to 0.2 $LD_{50}$.

The action in the field of peripheral vasodilation has been shown by the experimentation on perfused ear of rabbit where an action is noticed at doses from 0.5 mg./ml.

The action as hypolipemic and hypocholesterolemic agent has been proved on hypercholesterolemied rabbits which received 0.3 g./kg. of the compound of the invention. The results of dosage on total cholesterol, esterified cholesterol, triglycerids and total lipids are indicated in the table below (in grams):

| [1] | Total cholesterol | Esterified cholesterol | Triglycerids | Total lipids |
|---|---|---|---|---|
| A | 8.7 | 6.60 | 13.70 | 22.72 |
| B | 0.56 | 0.50 | 1.52 | 3.60 |
| C | 5.36 | 3.27 | 4.06 | 14.52 |

[1] A=Hypercholesterolemied rabbits (average values on 6 rabbits); B=Non-hypercholesterolemied and non-treated rabbits (controls: average values on 6 rabbits); C=Hypercholesterolemied and treated rabbits (average values on 6 rabbits).

This compound has been also reported as lowering the capillary permeability as shown by the test of Trypan Blue on rabbit, effective at doses between 5 and 50 mg./kg. per os.

This compound is to be used in drugs for the treatment of cerebral arteriosclerosis and of any form of arterisopathies. Preferably the doses should be between 0.5 and 1.5 g. per diem. The preferred form of administration is gelatine capsules which contain 0.10 or 0.25 g. of the compound together with an appropriate carrier (as lactose). The compound may be also administered by injection at doses from 0.1 to 1.0 g. per diem in one injection, for 10 days. In this case the dose of the dry compound is contained in phials and an extemporaneous solution is prepared before injection.

What is claimed is:

1. Beta-pyridyl carbinol nicotinoyl glycinate of the formula

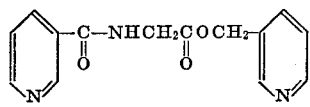

References Cited

Wolfe et al.: Chem. Abstracts, vol. 68, Item No. 68, 618s, Apr. 8, 1968.

ALAN L. ROTMAN, Primary Examiner

U.S. Cl. X.R.

260—295.5 R; 424—266